Patented July 4, 1950

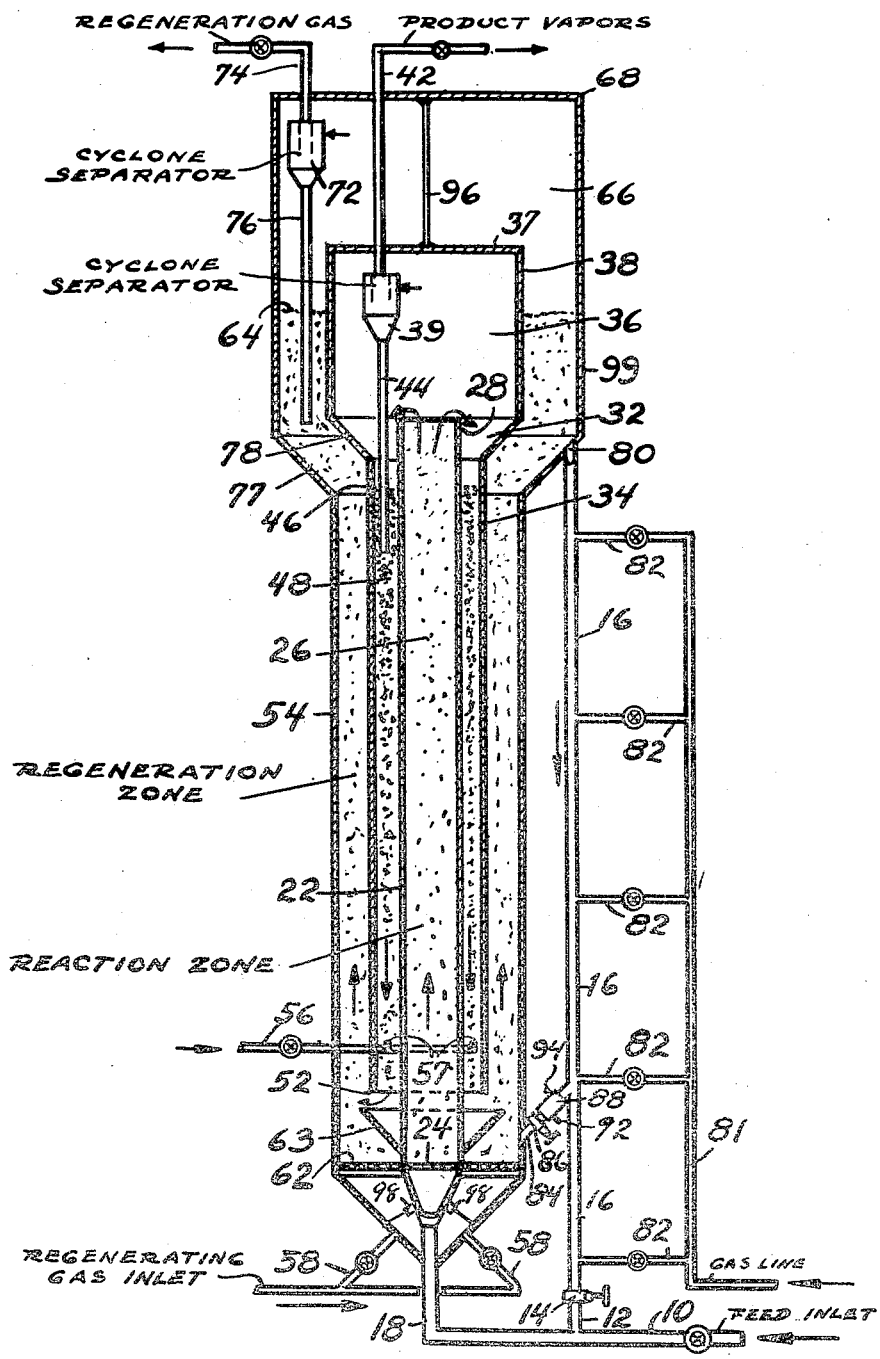

2,514,288

UNITED STATES PATENT OFFICE 2,514,288

METHOD AND APPARATUS FOR CARRYING OUT CATALYTIC REACTIONS

Edward W. S. Nicholson, Baton Rouge, La., assignor to Standard Oil Development Company, a corporation of Delaware Application December 29, 1942, Serial No. 470,433

10 Claims. (Cl. 196—52)

This invention relates to catalytic reactions wherein powdered catalyst is used and more particularly relates to the catalytic conversion of hydrocarbons using finely divided or powdered catalyst.

In the catalytic conversion of hydrocarbons or other catalytic reactions where the catalyst becomes fouled or spent it is necessary to regenerate the catalyst to provide a continuous process. For example, in the catalytic cracking of hydrocarbons the catalyst material becomes inactive or is fouled because carbonaceous material is deposited on the catalytic material. This carbonaceous deposit may be removed by burning with air or other gas containing free oxygen.

According to my invention a system is provided wherein the entire reaction section including the reaction zone, the regeneration zone, hoppers and cyclone separators are contained in a single vessel. Preferably the reaction zone is arranged in the center of the vessel extending along the axis thereof and the regeneration zone is annular and concentric with the reaction zone. Arranged between the reaction zone and the regeneration zone is an annular space which provides a stripping section.

Catalyst particles and reactants are introduced into the bottom portion of the reactor and the mixture in a relatively dense condition passes upwardly through the reactor. Spent catalyst particles leaving the top of the reaction zone overflow into the annular space between the reaction zone and the regeneration zone and stripping gas is introduced into the bottom portion of this space to remove volatile hydrocarbons from the spent catalyst particles. From the stripping zone the spent catalyst particles pass to the regeneration zone where they are maxied with air or other oxygen-containing gas to burn off carbonaceous deposits and to regenerate the catalyst particles. With this arrangement better stripping is obtained because the spent catalyst being adjacent to the regeneration zone is maintained at a higher temperature. Further, the annular space or stripping zone forms a seal between the reaction zone and regeneration zone to prevent intermixing of the gases or vapors in the separate zones.

In known processes where powdered catalyst is mixed with a gas or vapor to form a fluidized mixture more than one standpipe is necessary to circulate the catalyst from one zone to the other. With my arrangement only one standpipe is needed. Also, with my arrangement a simpler construction is provided. As a result of the simpler construction fewer expansion joints are necessary in the system.

In the drawing, the figure represents one form of apparatus which may be used to carry out my invention.

Referring now to the drawing, the reference character 10 designates a line through which the reactants are introduced into the system. The reactants or feed stock is mixed with powdered catalyst from line 12 below valve 14. The powdered catalyst is fed into line 12 from a standpipe 16 by means of the control or slide valve 14. The reactants and powdered catalyst are preferably at reaction temperature and the mixture is passed through line 18 into the bottom portion of a reaction zone 22 provided with a bottom perforated distribution plate 24. The mixture of catalyst and reactants is passed through the distribution plate to evenly distribute the mixture across the area of the reaction zone.

From the drawing, it will be seen that the reaction zone has a larger diameter than the inlet line 18 and because of the larger cross-sectional area the velocity of the vapors or gases passing through the reaction zone is reduced and a relatively dense mixture of catalyst particles in vapors or gases is obtained.

In the catalytic cracking of hydrocarbons to make motor fuels or aviation gasoline the powdered catalyst may be acid activated bentonite clays, synthetic silica alumina catalyst or synthetic silica magnesia catalyst or other active cracking catalysts. The catalyst has a fineness of about 200 to 400 standard mesh or finer with less than about 25% of particles having a size between about 0 and 20 microns. For catalytic cracking the ratio of catalyst to liquid oil by weight may vary between about 2 to 1 and 20 to 1 part by weight. The density of the fluidized mixture in the reaction zone will be about 10 to 25 lbs./cu. ft., but preferably conditions are arranged to give a density of around 15 lbs./cu. ft.

In the reaction zone the catalyst particles are maintained in a turbulent condition and intimate contact between the catalyst particles and vapors or gases is obtained. Due to the good mixing the temperature during the reaction is maintained substantially constant throughout the reaction zone. The catalyst particles and the reactants are maintained in the reaction zone for the desired time to effect the desired extent of reaction or conversion. The relatively dense mixture of catalyst is shown at 26 in the reaction zone 22.

When the catalyst and reaction products reach the top 28 of the reaction zone, the mixture is introduced into a larger cross section and the catalyst particles drop into the annular chamber 32 extending between the exterior of the reaction zone 22 and a larger concentric cylindrical member 34. The vaporous reaction products pass upwardly and enter the enlarged space 36 which is termed a disengaging space. The space or chamber 36 has a relatively large cross-sectional area and due to the increased area the velocity of the vapors or gases is reduced to about 1.5 feet per second and most of the catalyst particles are separated from the reaction vapors or gases. The enlarged volume or chamber 36 has a closed top 37. In order to separate entrained catalyst particles from the reaction vapors or gases, the gases or vapors are passed to a cyclone separating means 39 arranged within the enlarged volume 36. One or more cyclone separators may be used. While the separating means is shown as arranged within the enlarged chamber 36, it is to be understood that the separating means may be arranged outside of the chamber 36. The separated gases or vapors pass overhead through line 42 and may be further treated to separate desired products.

The separated catalyst particles are withdrawn from the separating means 39 and passed through line or pipe 44 which dips below the surface 46 of the catalyst particles 48 in the annular space 32. As the gases or vapors have been separated from the catalyst particles, the mixture in the annular space 32 forms a relatively dense mixture shown at 48. This mixture is of greater density than that at 26 in the reactor 22, being about 25 to 30 lbs./cu. ft.

The cylindrical member 34 forming the outer wall of the annular space 32 has its lower end 52 arranged above the lower portion of the reaction zone 22 and empties the spent or fouled catalyst into the regeneration zone 54 because the pressure at the bottom of stripping zone 32 is greater than in regeneration zone 54. The regeneration zone is formed by a larger concentric cylindrical member.

The spent catalyst in the annular space 32 is stripped of volatile hydrocarbons or volatile material by introducing a suitable stripping gas through line 56 into the lower portion of the annular space 32. Preferably, an annular distributor pipe 57 provided with a plurality of holes is used to give uniform dispersion of the gas in the annular space 32. For certain catalysts steam may be used as a stripping agent but in case the steam adversely affects the catalyst normally gaseous hydrocarbons or other inert gases may be used. The stripping gas passes upwardly through the annular space and strips the catalyst particles and the stripping gas and volatilized material pass into the enlarged chamber 36 above described.

Where the catalyst particles are fouled with a combustible deposit, a regenerating medium, such as air or other oxygen-containing gas for burning the deposit is introduced into the bottom of the regeneration zone 54 through lines 58 below a perforated distribution plate 62 which distributes the regenerating gas evenly across the regeneration zone. A guard or baffle 63 is provided below cylinder 34 to prevent regenerating gas from entering the stripping zone 32. In the regeneration of acid activated bentonite clays used for catalytic cracking of hydrocarbons the temperature during regeneration is maintained below about 1200° F. to prevent fusing or deactivation of the catalyst particles.

During regeneration, the catalyst particles are maintained in a turbulent condition and as a relatively dense mixture and due to the turbulent condition intimate contact between the catalyst particles and regenerating gas is obtained. During regeneration heat is liberated and at least a part of this heat increases the temperature of the catalyst in the stripping section 32 so that improved stripping is obtained. Also, due to the turbulent condition of the catalyst particles in the regeneration zone the temperature is maintained substantially constant throughout the regeneration zone. The density of the mixture in the regeneration zone is about 15 to 20 lbs./cu. ft. but may vary between about 10 and 25 lbs./cu. ft.

As an alternate arrangement, regenerating gas may be introduced into regeneration zone 54 above the lower end of the stripping zone and auxiliary bleeds are provided for injecting inert gas into the bottom of the regeneration zone in case the catalyst becomes deaerated.

The catalyst and regeneration gas mixture in the regeneration zone has a level indicated at 64 within the regeneration zone. The regeneration gases are separated from the regenerated catalyst particles in the enlarged separating zone 66 arranged in the upper portion of the reaction vessel. Due to the increased area the velocity of the regeneration gases is reduced to about 1.5 feet per second and catalyst particles are in this way separated from the gases. The enlarged space or chamber 66 which may be termed a disengaging space has a closed top 68. The regeneration gases containing some entrained catalyst pass upwardly in space 66 and through the separating means 72 for separating solid particles from gases. The separating means in the drawing is shown as a cyclone separator but other separating means may be used and also one or more cyclone separators may be used. While the separating means is shown as arranged in the enlarged chamber 66, it may be arranged outside of this chamber.

The separated regeneration gases pass overhead through line 74 and may be vented to the atmosphere or they may be passed through a Cottrell precipitator for further recovery of catalyst. The separated regenerated catalyst particles are withdrawn from the separating means and passed through a line or pipe 76 which dips beneath the level 64 of the catalyst undergoing regeneration.

The regeneration vessel 54 has an outwardly flared portion 77 near its upper portion which flared portion parallels flared portion 78 on the disengaging chamber 36 above described. The catalyst undergoing regeneration forms a relatively dense mixture. With acid treated bentonite clays having a size of about 200 to 400 standard mesh the density is about 15 to 20 lbs./cu. ft. in the preferred velocity range.

The regenerated catalyst particles are withdrawn through an opening 80 in the flared portion 77 and flow into the standpipe 16 previously described. Preferably a fluidizing gas is introduced from manifold 81 through lines 82 into the standpipe 16 at spaced points to maintain the regenerated catalyst particles in fluidized condition. The density of the regenerated catalyst in standpipe 16 is about 25 to 35 lbs./cu. ft. when using an acid treated bentonite clay of the fineness above described, so that the pressure produced at the bottom of standpipe 16 is greater than the pressure in inlet line 10 and catalyst flows into line 10.

During regeneration it is important to prevent the temperature from exceeding certain limits when using catalysts which may be injured by heat. In such cases a portion of the regenerated catalyst may be withdrawn from the standpipe 16, cooled and returned to the regeneration zone 54 to control the temperature during regeneration. For this purpose line 84 is provided connecting the lower portion of the standpipe 16 with the regeneration zone 54 above the distribution plate 62. Line 84 is provided with a control valve 86 for controlling the amount of catalyst returned to the regeneration zone. Ahead of the valve 86 a cooler 88 is provided having an inlet 92 and an outlet 94 for the circulation of a heat exchange medium. Heat taken out of the regenerated catalyst may be supplied to the reaction zone, to the reactants or charge or may be otherwise utilized.

The disengaging chamber 36 is supported within the larger disengaging chamber 66 in any suitable manner and a supporting means 96 is diagrammatically shown for suspending the disengaging chamber 36 from the top 68 of the larger enclosing disengaging chamber 66. The reaction zone 22 may be supported in any suitable manner. In the drawing the lower portion of the reaction zone 22 is supported by means diagrammatically shown at 98 which extend between the bottom portion of the reaction zone 22 and the bottom conical portion of the outer shell of the enclosing vessel. By supporting one vessel only at the top and one at the bottom, the number of expansion joints can be greatly reduced.

My invention is well adapted for catalytic reactions wherein the temperature during reaction and regeneration are about the same, such as in dehydrogenation of hydrocarbons. My invention can also be used for reactions which are conducted at a different temperature from the regeneration temperature by installing insulation in addition to that furnished by the layer of spent catalyst in the stripping zone. Or regeneration temperatures can be lowered somewhat to more closely approach reaction temperatures. My invention is also especially adapted for reactions which are endothermic, as the heat of reaction may be supplied in part or wholly by the heat of regeneration. If desired, fins may be installed on the reaction zone and the annular member 34 if greater heat transfer surface is required.

The space between vessels 99 and 38 adjacent chamber 36 may be of any desired size to provide suitable catalyst holdup space.

An example of dehydrogenation of butane to butenes will now be given. For this reaction any suitable powdered dehydrogenating catalyst is used such as chromium oxide alumina catalyst or the like. The catalyst has a size of about 200 to 400 standard mesh or finer and the catalyst to oil ratio by weight is about 5 to 20 lbs. per lb. of butane.

The butane or butane-containing gas at a temperature of about 1050° F. is mixed with powdered dehydrogenating catalyst from the standpipe 16, the catalyst being at a temperature of about 1100° F. The mixture is passed upwardly through the reaction zone 22 and the time of residence of the hydrocarbon mixture in the reaction zone is about 30 to 300 seconds. At the top 28 of the reaction zone 22 the spent catalyst particles are separated from products obtained during the dehydrogenation. The yield of butenes is about 30% by weight on the feed.

The separated catalyst particles then pass through the annular sealing chamber 32 where they are stripped and then passed to the regeneration zone 54 where they are mixed with air to remove carbonaceous material from the catalyst particles. The temperature during regeneration is about 1100° F. Regenerated catalyst is then withdrawn from the regeneration zone through standpipe 16. Regeneration gases leave the vessel through line 74.

As another example, in the catalytic cracking of hydrocarbons to make motor fuel, gas oil vapors at a temperature of about 850° F. to 1000° F. are passed through line 10 and mixed with regenerated catalyst particles from standpipe 16. The regenerated catalyst particles are at a temperature of about 1050° F. In the catalytic cracking of hydrocarbons any suitable cracking catalyst is used such as acid treated bentonite clay having a size of about 200 to 400 standard mesh or finer.

The mixture of oil vapors and catalyst is passed through the reaction zone 22, reaction products in vapor form are separated from spent catalyst and the reaction vapors withdrawn from the vessel through line 42.

The spent catalyst is passed to the stripping zone 32 and then to the regeneration zone 54 wherein it is mixed with air or other regenerating gas to burn off combustible deposits from the catalyst. During regeneration the temperature is maintained at about 1100° F.

Instead of feeding gas oil vapors into the line 10 as feed, the oil to be cracked may be introduced in liquid form or partly preheated to form a mixture of liquid and vapors. Such an operation is especially adapted for use in the manufacture of aviation gasoline from light gas oils or the like. The temperature during cracking to aviation gasoline is about 800° F. to 1000° F. and a sufficient amount of catalyst or catalyst plus inert material is used to completely vaporize the oil stock and to supply heat of reaction or cracking in the reaction zone 22. However, relatively heavy stocks may be used as liquid feeds for my process to make regular motor gasoline.

While I have shown one form of apparatus which may be used to carry out my invention and have given several examples, it is to be understood that these are by way of illustration only and changes and modifications may be made without departing from the spirit of my invention.

I claim:

1. An apparatus for carrying out reactions, which includes a vertically arranged inner vessel open at its upper end, means for introducing a gasiform fluid and a powdered solid into the lower portion of said vessel, means for separating powdered solid from gasiform fluid leaving the upper end of said vessel, an intermediate vessel surrounding said inner vessel to provide a space for receiving separated solid material, an outer vessel surrounding and spaced from said intermediate vessel and forming a solid material receiving zone, said intermediate vessel terminating above the bottom of said outer vessel for delivering solid material to said outer vessel, means for introducing a gasiform fluid into said outer vessel, and means for withdrawing solid material from said outer vessel and returning it to said inner vessel.

2. Apparatus according to claim 1, in which an enlarged chamber is provided at the top of said intermediate vessel and a device for separating solids from gasiform fluid is installed in said chamber.

3. Apparatus according to claim 1, in which an enlarged chamber is provided at the top of said intermediate vessel, an enlarged chamber surrounding said first-mentioned enlarged chamber is provided at the top of said outer vessel, and a device for separating solids from gasiform fluid is provided in each of said enlarged chambers.

4. An apparatus for carrying out catalytic reactions which includes a vertically arranged reaction vessel open at its upper end, means for introducing a reactant and powered catalyst into the lower portion of said reaction vessel, means for separating powdered catalyst from reaction vapors leaving the upper end of said reaction vessel, an intermediate vessel surrounding said reaction vessel to provide a space for receiving the separated catalyst, an outer vessel surrounding and spaced from said intermediate vessel and forming a regeneration zone, said intermediate vessel terminating above the bottom of said outer vessel for delivering catalyst to said outer vessel, means for introducing a regenerating medium into said outer vessel and means for withdrawing regenerated catalyst from said outer vessel and returning it to said reaction vessel.

5. An apparatus according to claim 1 wherein means for introducing gasiform fluid are provided near the bottom of the space between said reaction zone and intermediate vessel, whereby said space constitutes a stripping zone to remove volatile material from the catalyst before passing it to said regeneration zone.

6. An apparatus for carrying out catalytic reactions which includes vertically arranged concentric reaction vessels separated by a chamber connecting said reaction vessels, means for introducing a reactant and powdered catalyst into the bottom of the inner vessel, means for separating dry powdered catalyst from the reaction products and for introducing the catalyst into said chamber, means for stripping the catalyst in said chamber, said chamber having a bottom open end for delivering the catalyst to the outer reaction vessel, means for introducing a reactant into said outer reaction vessel and means whereby catalyst is removed from said outer reaction vessel.

7. A method of carrying out catalytic reactions which comprises mixing powdered catalyst and a reactant in a vertical reaction zone having an open top, separating dry catalyst from vaporous reaction products, passing the separated catalyst into a chamber surrounding said reaction zone, stripping the catalyst in said chamber, passing the stripped catalyst to a regeneration zone concentric and exterior to said reaction zone, introducing a regenerating gas into said regeneration zone, withdrawing regenerated catalyst from said regeneration zone and returning it to said reaction zone.

8. A method of converting hydrocarbons in the presence of powdered catalyst which comprises mixing powdered conversion catalyst with relatively heavy hydrocarbons and maintaining the mixture as a dry fluidized mass in a reaction zone for a sufficient time for the desired conversion, withdrawing vaporous reaction products from said reaction zone, withdrawing spent catalyst from said reaction zone and introducing it into the upper portion of an annular stripping zone surrounding at least a portion of said reaction zone, stripping the spent catalyst in said stripping zone, passing the stripped spent catalyst to a regeneration zone surrounding at least a portion of said stripping zone, introducing a regenerating gas into said regeneration zone, withdrawing regenerated catalyst from said regeneration zone and supplying heat to the catalyst in said stripping zone from said regeneration zone.

9. A method of converting hydrocarbons in the presence of powdered catalyst which comprises mixing powdered catalyst and hydrocarbons in a reaction zone, withdrawing vaporous reaction products and overflowing spent catalyst from said reaction zone into a stripping zone concentric with said reaction zone, stripping the spent catalyst, passing the stripped catalyst to a regeneration zone concentric with said stripping zone, introducing a regenerating gas into the lower portion of said regeneration zone and withdrawing regenerated catalyst from the upper portion of said regeneration zone, the stripping zone acting as a seal between said reaction zone and said regeneration zone.

10. A method of converting hydrocarbons in the presence of powdered catalyst which comprises mixing powdered conversion catalyst with relatively heavy hydrocarbons and maintaining the mixture as a dry fluidized mass in a reaction zone for a sufficient time for the desired conversion, withdrawing vaporous reaction products from said reaction zone, withdrawing spent catalyst from said reaction zone and introducing it into the upper portion of an annular stripping zone concentric with and surrounding said reaction zone, stripping the spent catalyst in said stripping zone, passing the stripped spent catalyst to a regeneration zone surrounding at least a portion of said stripping zone and said reaction zone, introducing a regenerating gas into said regeneration zone, withdrawing regenerated catalyst from said regeneration zone and supplying heat to the catalyst during stripping in said stripping zone from said regeneration zone to obtain improved stripping.

EDWARD W. S. NICHOLSON.

REFERENCES CITED

The following references are of record in the file of this patent:

UNITED STATES PATENTS

| Number | Name | Date |
| --- | --- | --- |
| 1,380,067 | Koch | May 31, 1921 |
| 1,601,938 | Campbell | Oct. 5, 1926 |
| 1,989,406 | Doolittle | Jan. 29, 1935 |
| 2,302,328 | Kelly | Nov. 17, 1942 |
| 2,304,128 | Thomas | Dec. 6, 1942 |
| 2,428,872 | Gunness | Oct. 14, 1947 |

FOREIGN PATENTS

| Number | Country | Date |
| --- | --- | --- |
| 533,037 | Germany | Sept. 8, 1931 |